Figure 1:
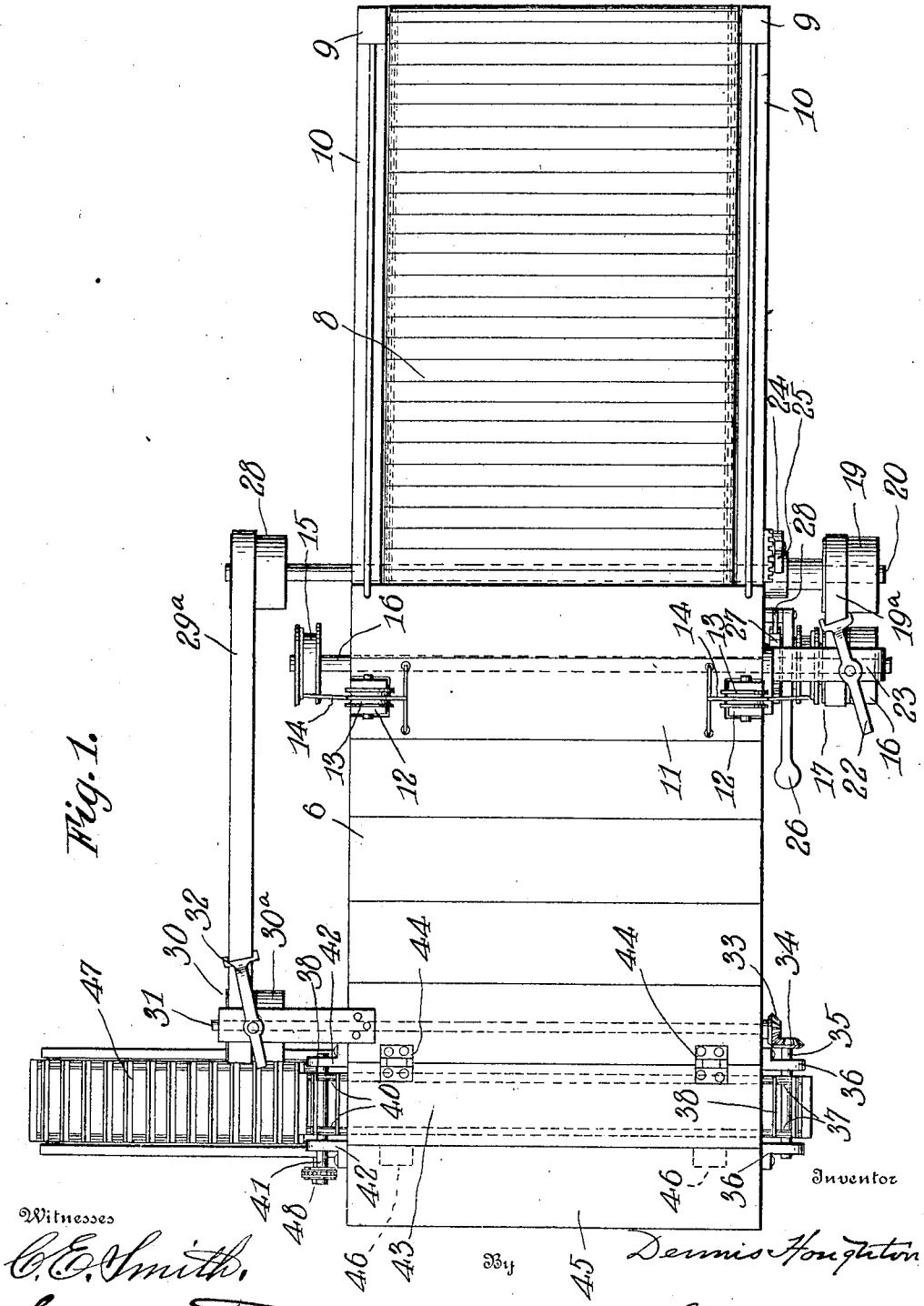

No. 876,056.　　　　　　　　　　　　　　　PATENTED JAN. 7, 1908.
D. HOUGHTON.
DUMP AND ELEVATOR.
APPLICATION FILED MAY 2, 1907.

3 SHEETS—SHEET 1.

Witnesses
C. E. Smith
Geo. E. Tew

Inventor
Dennis Houghton
By
Milo B. Stevens,  Attorneys

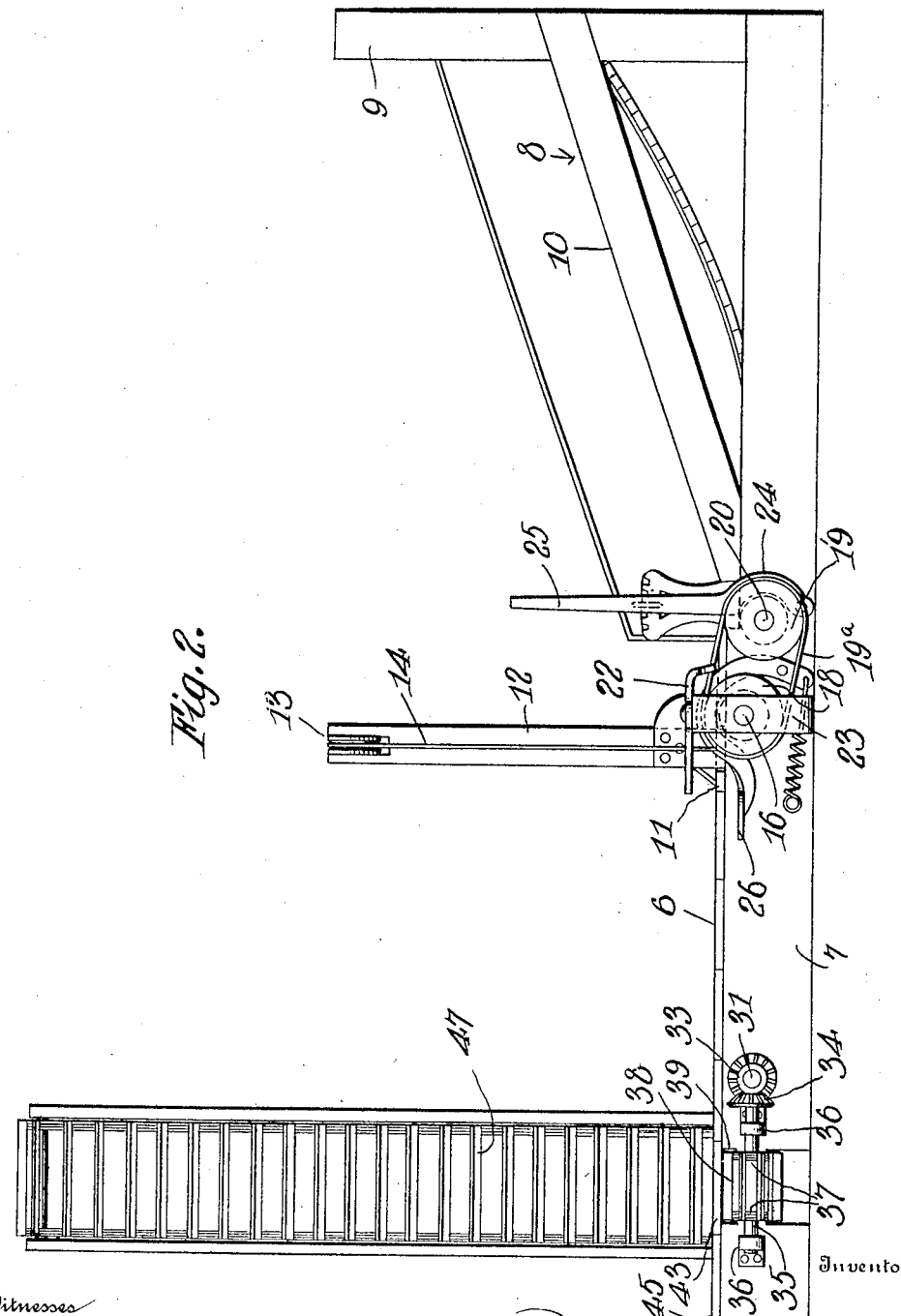

No. 876,056. PATENTED JAN. 7, 1908.
D. HOUGHTON.
DUMP AND ELEVATOR.
APPLICATION FILED MAY 2, 1907.
3 SHEETS—SHEET 3.
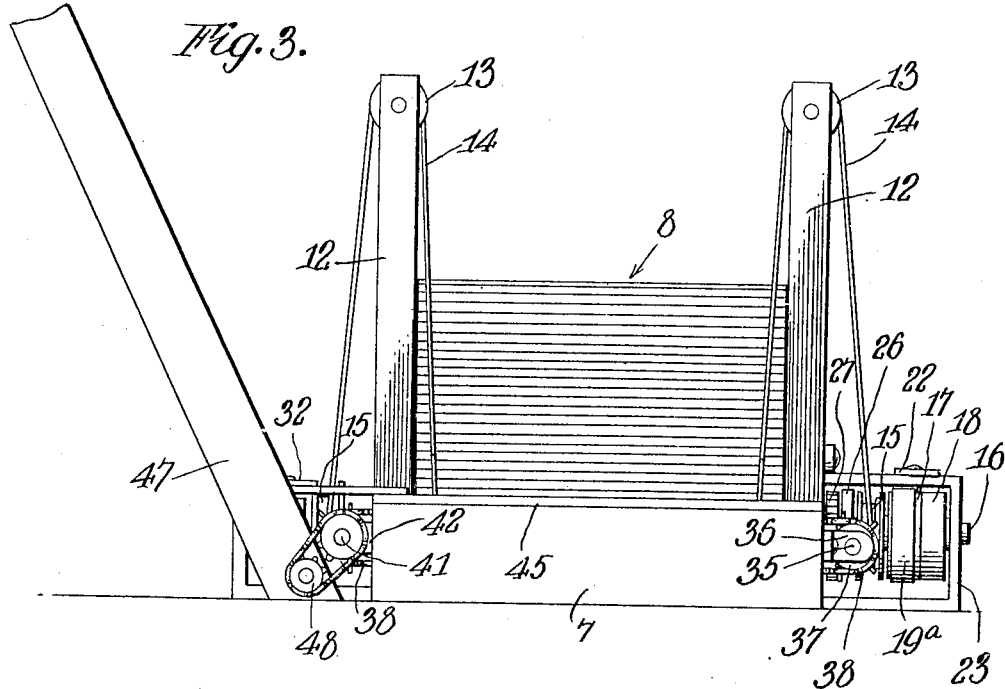
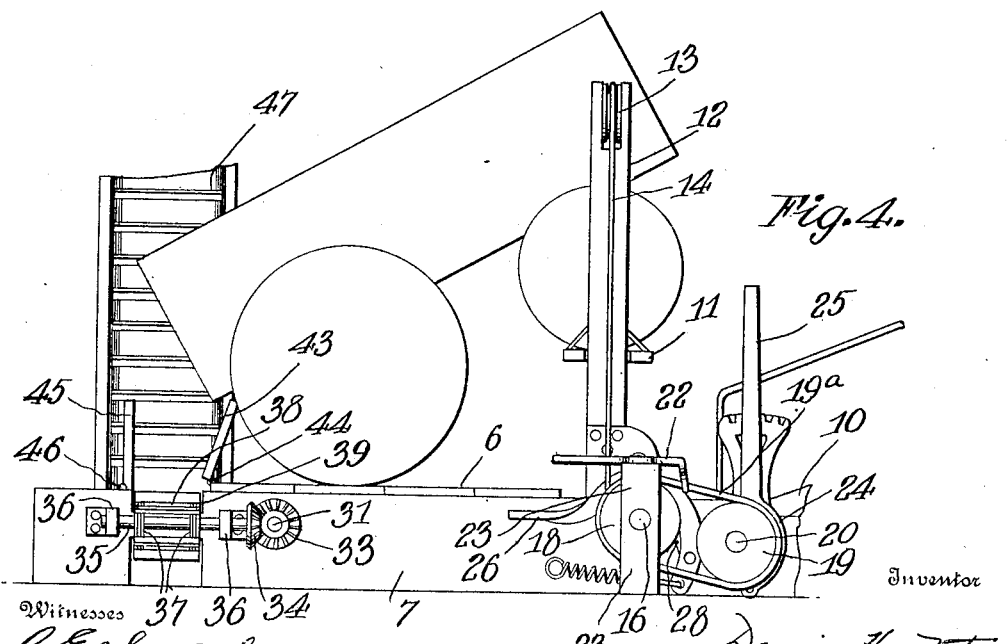

UNITED STATES PATENT OFFICE.

DENNIS HOUGHTON, OF PETERSBURG, ILLINOIS.

DUMP AND ELEVATOR.

No. 876,056.        Specification of Letters Patent.        Patented Jan. 7, 1908.

Application filed May 2, 1907. Serial No. 371,448.

*To all whom it may concern:*

Be it known that I, DENNIS HOUGHTON, a citizen of the United States, residing at Petersburg, in the county of Menard and State of Illinois, have invented certain new and useful Improvements in Dumps and Elevators, of which the following is a specification.

This invention is a grain dump and elevator of that type particularly designed for dumping grain or the like from a wagon and conveying and elevating the same, such as into a bin or the like, the power for operating the dump and the conveyer and elevator being furnished by a horse power operated by the team hitched to the wagon.

The object of the invention is to make various improvements in this class of devices, as will be more apparent from the following description and particularly pointed out in the claims.

The apparatus is illustrated in the accompanying drawings, in which

Figure 1 is a plan view thereof. Fig. 2 is a side elevation. Fig. 3 is an end elevation. Fig. 4 is a partial side elevation with the conveyer trough open and the front end of the wagon hoisted to dump the grain into the conveyer.

Referring specifically to the drawings, 6 indicates the platform mounted upon sills 7, which latter are continued or extended beyond the front end of the platform to support an inclined horse power 8 of the usual endless belt construction, suitable ports 9 and braces 10 being mounted upon the sills to support the belt or tread.

The platform 6 has at the front end a loose board 11 which is notched at the ends to slide up and down on vertical posts 12 which form guides therefor. These posts have pulleys 13 at the top, over each of which passes a rope 14 one end of which is connected to the plank 11 and the other end of which is connected to a drum 15, of which there is one at each end of a shaft 16 which extends across under the front end of the platform and finds its bearings in the sills 7. The shaft 16 is provided with fast and loose pulleys 17 and 18, connected by a belt 19$^a$ to a pulley 19 on a shaft 20, which is driven directly from the chain belts of the tread of the horse power. The belt 19$^a$ may be thrown on either the fast or loose pulley by a belt shifter 22 supported by a bracket 23 connected to the platform.

The shaft 20 is provided with a band brake 24 operated by a hand lever 25, for the purpose of controlling the speed of the horse power, or for preventing movement thereof. The shaft 16 is also provided with a friction foot brake 26 which may be pressed down to control the unwinding of the drums and allow the front end of the wagon to drop gradually. The shaft 16 also has a ratchet 27 which is engaged by a detent 28 pivoted to the sill of the platform, to prevent back slip, except when the detent is swung out of engagement with the ratchet, which may be done by hand when it is desired to lower the wagon.

The end of the shaft 20 opposite that containing the pulley 19 is provided with a pulley 28 connected by a belt 29 with fast and loose pulleys 30 and 30$^a$ on a shaft 31 which extends across under the platform near the front end thereof. The belt shifter 32 controls the drive of the shaft. This shaft has a bevel gear 33 on its right or opposite end which meshes with a gear 34 on a shaft 35 which is supported by brackets 36 on the side sill of the platform and carries sprockets 37 over which run the chains of a belt conveyer 38 which traverses a trough 39 sunken below the surface of the platform. At the opposite end the chains of the belt conveyer pass over sprockets 40 on a shaft 41 supported by brackets 42 on the other side of the platform.

The cover of the trough is formed by one of the planks 43 of the platform, the plank being hinged at 44 to the next board adjacent or just beyond the forward edge or side of the trough. The adjacent or preceding board of the platform, indicated at 45, is hinged underneath to the forward side of the trough, as indicated at 46, and is adapted to swing into vertical position above and beside said trough, as indicated in Fig. 4, the cover 43, at the same time, swinging to open position against the wheels of the wagon in position for dumping on the platform.

The conveyer 38 delivers to a belt elevator 47 which extends upwardly and laterally from the end of the conveyer and may be supported by any proper or suitable framework to deliver the grain into a bin or window or other place desired. The elevator 47 is driven by chain and sprocket connections indicated at 48 to the shaft 41 at the end of the conveyer.

As shown, the drive shaft 20 of the horse power has independent connections or gearing to the hoist and to the conveyer, each of said connections including fast and loose pulleys and a shifter, so that either may be operated independently or both may be operated together.

In practice, it will be found desirable to first operate the hoist to lift the front end of the wagon, and, when lifted, the hoist gearing can be shifted off and disconnected and the conveyer gearing thrown into action, at the same time allowing the grain to run out or dump from the wagon, when it will fall into the trough and be conveyed to and elevated by the elevator 47 to the desired place. When the wagon is driven onto the platform the planks 43 and 45 are closed down or flat with the platform, and after the wagon reaches the proper position they may be raised to form shields or guides to direct the grain into the trough of the conveyer. By means of the brakes shown the moving parts may be controlled to slow or vary the speed thereof. The capacity for independent operation of the hoist and the conveyer will save the team, inasmuch as driving both the hoist and the conveyer and the elevator at the same time will ordinarily require great strain or effort.

The apparatus may be mounted on wheels if desired for the purpose of rendering the same portable.

I claim:

1. The combination of a wagon-receiving platform, a horse-power beyond the front end thereof, a pair of posts beside the said front end, having pulleys at the top, a board forming part of the platform, slidable up and down between the posts, a shaft extending across under the platform and having a winding drum at each end with cables extending over the pulleys and connected to the board, and gearing between the horse-power and the shaft.

2. The combination of a wagon-receiving platform, a horse-power beyond the front end thereof, a wagon hoist at the front end including a winding shaft, gearing between the horse power and the shaft, including means to engage or disengage the same, and a brake operating on said winding shaft.

3. The combination of a wagon-receiving platform, a horse-power adjacent thereto, a wagon hoist at one end of the platform, a conveyer at the other end, a shaft extending across the rear end of the horse power and driven thereby and having a pulley on each end, and separate gearing between the pulleys and the hoist and conveyer respectively, including a belt, a shifter, and fast and loose pulleys.

In testimony whereof I affix my signature, in presence of two witnesses.

DENNIS HOUGHTON.

Witnesses:
R. S. REILE,
H. O. ROGGE.